United States Patent
del Prado Pavon et al.

(10) Patent No.: US 7,120,092 B2
(45) Date of Patent: Oct. 10, 2006

(54) SYSTEM AND METHOD FOR PERFORMING CLOCK SYNCHRONIZATION OF NODES CONNECTED VIA A WIRELESS LOCAL AREA NETWORK

(75) Inventors: Javier del Prado Pavon, Ossining, NY (US); Sai Shankar Nandagopalan, Tarrytown, NY (US); Sunghyun Choi, Seoul (KR); Takashi Sato, Scarborough, NY (US); Jeff Bennet, Spring Valley, NY (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 882 days.

(21) Appl. No.: 10/289,758

(22) Filed: Nov. 7, 2002

(65) Prior Publication Data

US 2003/0172179 A1 Sep. 11, 2003

Related U.S. Application Data

(60) Provisional application No. 60/362,518, filed on Mar. 7, 2002.

(51) Int. Cl.
*G04C 11/00* (2006.01)
*H04J 3/06* (2006.01)
*H04L 7/00* (2006.01)

(52) U.S. Cl. .................... 368/46; 368/47; 370/350; 370/509; 375/356

(58) Field of Classification Search ............ 368/10, 368/46, 47; 370/324, 350; 503/503, 509, 503/510; 375/356, 362–365
See application file for complete search history.

(56) References Cited

U.S. PATENT DOCUMENTS

| | | | | | |
|---|---|---|---|---|---|
| 3,806,879 | A | * | 4/1974 | Schmidt et al. | 370/324 |
| 4,161,719 | A | * | 7/1979 | Parikh et al. | 375/365 |
| 5,402,394 | A | * | 3/1995 | Turski | 368/10 |
| 5,661,700 | A | * | 8/1997 | Weppler | 368/46 |
| 5,848,028 | A | * | 12/1998 | Burklin | 368/46 |
| 5,875,179 | A | * | 2/1999 | Tikalsky | 370/315 |
| 6,044,091 | A | * | 3/2000 | Kim | 370/508 |
| 6,347,084 | B1 | * | 2/2002 | Hulyalkar et al. | 370/347 |
| 6,778,623 | B1 | * | 8/2004 | Dietrich et al. | 375/376 |
| 6,791,551 | B1 | * | 9/2004 | Mukherjee et al. | 345/504 |
| 7,016,998 | B1 | * | 3/2006 | Mukherjee | 710/260 |
| 2004/0246998 | A1 | * | 12/2004 | Ma et al. | 370/527 |

* cited by examiner

*Primary Examiner*—Vit W. Miska

(57) ABSTRACT

A clock synchronization method and apparatus is disclosed for use in a communication system including a plurality of wireless nodes communicatively coupled via a wireless network, each of the plurality of wireless nodes having a local time base, and one of the plurality of wireless nodes being designated as a master node having a master time base which serves as a master clock against which the local time bases are synchronized. The clock synchronization method includes the steps of periodically transmitting synchronization frames to the plurality of non-master nodes so as to adjust the slave clocks associated with the respective non-master nodes. The synchronization frames are distributed from the master node at near-periodic intervals and includes a cycle time value that corresponds to the end of the previously transmitted synchronization frame. The slave clocks (i.e., non-master nodes) receiving the synchronization frame determine the cycle time value at the point of reception of the synchronization frame and adjusts their clocks by calculating a difference value between the received cycle time and a previously saved local cycle time value.

15 Claims, 4 Drawing Sheets

STEP 55

> I th ITERATION CYCLE   AT MASTER NODE
>
> (1) TRANSMITS SYNCHRONIZATION FRAME $F_i$ OVER THE NETWORK TO ALL NON-MASTER NODES, THE FRAME INCLUDING CYCLE-TIME = $a(n_{i-1})$ AND SEQUENCE NUMBER = $n_{i-1}$ SAVED IN THE PREVIOUS ITERATION CYCLE
> (2) DETECTS SYMBOL POSITION (e.g. pt. A.) IN TRANSMITTED SYNCHRONIZATION FRAME $F_i$

STEP 57

> I th ITERATION CYCLE   AT MASTER NODE
>
> (1) SAVES CYCLE TIME VALUE, $a(n_i)$, CORRESPONDING TO TIME OF DETECTION OF PT. A OF TRANSMITTED SYNCHRONIZATION FRAME $F_i$ AT STEP 55; AND
> (2) ALSO SAVES THE SEQUENCE NUMBER $n_i$ OF SYNCHRONIZATION FRAME, $F_i$

STEP 59

> I th ITERATION CYCLE   AT MASTER NODE
>
> ADJUST THE VALUE OF $a(n_i)$ TO ACCOUNT FOR THE TIME DELAY IN REPORTING THE VALUE TO THE UPPER LAYERS.

STEP 61

> I th ITERATION CYCLE   AT NON-MASTER NODE
>
> DETECT SYMBOL POSITION (E.G. PT. A) FROM RECEIVED SYNCHRONIZATION FRAME $F_i$.

STEP 63

> I TH ITERATION CYCLE   AT NON-MASTER NODE
>
> (1) SAVE LOCAL CYCLE TIME VALUE $b(n_i)$ CORRESPONDING TO TIME OF DETECTION OF PT. A IN RECEIVED SYNCHRONIZATION FRAME $F_i$.
> (2) ALSO SAVES THE SEQUENCE NUMBER $n_i$ OF SYNCHRONIZATION FRAME, $F_i$

FIG. 3a

STEP 65

> I th ITERATION CYCLE   AT NON-MASTER NODE
>
> ADJUST THE VALUE OF $b(n_i)$ TO ACCOUNT FOR THE TIME DELAY IN REPORTING THE VALUE TO THE UPPER LAYERS

STEP 67

> I th ITERATION CYCLE   AT NON-MASTER NODE
>
> MASTER NODE COMPUTES CYCLE TIME DIFFERENCE VALUE. $a(n_{i-1}) - b(n_{i-1})$

STEP 69

> I th ITERATION CYCLE   AT NON-MASTER NODE
>
> LOCAL TIME BASE OF NON-MASTER NODE IS ADJUSTED IN ACCORDANCE WITH COMPUTED CYCLE TIME DIFFERENCE VALUE.

FIG. 3b

SYSTEM AND METHOD FOR PERFORMING CLOCK SYNCHRONIZATION OF NODES CONNECTED VIA A WIRELESS LOCAL AREA NETWORK

CROSS REFERENCE TO RELATED APPLICATION

This application claims the benefit of U.S. Provisional Application Ser. No. 60/362,518 filed on Mar. 7, 2002, the teachings of which are incorporated herein by reference.

BACKGROUND OF THE INVENTION

1. Field of the Invention

The present invention relates generally to clock synchronization, and more particularly, to a clock synchronization protocol for performing stringent clock synchronization across multiple nodes.

2. Description of the Related Art

High precision clock synchronization is one of the most basic requirements in distributed real-time systems. Due to the unavoidable drift of local clocks, a global time base can only be achieved by means of a clock synchronization protocol.

The present invention, in its broadest application, is directed to a clock synchronization protocol for wirelessly synchronizing clock registers of nodes via a wireless local area network (e.g., 802.11 network). The present invention requires that systems employing the method of the invention operate in accordance with broadcast medium principles. That is, the present invention is intended for use in those systems in which a central or master node broadcasts messages (data) to a plurality of slave nodes in the network. Application of the method has potential widespread use whereby the nodes may be associated with any wired and/or wireless communication systems. For example, the nodes may be associated with well-known wired communication systems, such as Ethernet or 802.3. Alternatively, the nodes may be associated with wireless communication systems. For example, the principles of the present invention will be described herein in the context of a wireless embodiment including 1394 nodes wirelessly coupled via an 802.11 wireless local area network (WLAN). It is to be appreciated, however, that the wireless embodiment is a non-limiting exemplary embodiment.

Although a detailed description of the 1394 standard will not be provided herein, an overview of certain aspects of bus and node architecture will be presented to aid in understanding the present invention in a wireless context.

1394 Bus Overview

The IEEE 1394-1995 standard (also popularly known as "Firewire"™) describes a high speed, low cost serial bus to which compatible devices can be connected (even hot plugged) and automatically recognized. The IEEE 1394 standard defines a digital interface thereby eliminating the need for an application to convert digital data to analog data before it is transmitted across the bus.

IEEE 1394 currently defines a maximum wired distance or length of 4.5 meters. Thus, intrinsically, an IEEE 1394 serial bus can only be used to interconnect components which are relatively close together. Such a system of interconnected components which are close together is commonly referred to as a "cluster". An exemplary cluster in a residential environment is a "multimedia island" such as a home entertainment cluster, a home computing cluster, a bedroom cluster, etc. The IEEE 1394 standard defines a simple mechanism to achieve clock synchronization between nodes in a single cluster.

It is possible to interconnect clusters, to extend their range via a wired or wireless connection. Currently, the P1394.1 working group makes the protocol standardization activities of a bridge for connecting two adjacent 1394 buses used in an IEEE-1394 high-speed serial bus communication environment, referred to as the 1394.1 bridge specification. As described above, high precision clock synchronization is required between the 1394 nodes in a single cluster, however, clock synchronization is also required between nodes across different clusters. Therefore, the specification defines a method of synchronizing two adjacent 1394 buses connected with a 1394.1 wired bus bridge.

Another approach to extending the IEEE 1394 serial bus is to create a wireless "bridge" between clusters. That may promise ease-of-use and the flexibility associated with an IEEE 1394 network. In general, it can be expected that wired IEEE 1394.1 bridges will be the pre-dominant approach within new residential buildings since IEEE 1394 "outlets" may be installed within every room. However, retrofitting wired IEEE 1394.1 bridges in existing residences may prove cost-prohibitive for many residences due to the extensive rewiring which will be required. Thus, for such existing residences, wireless IEEE 1394 bridges, if sufficiently low-cost, may provide a suitable alternative.

In support of the afore-mentioned approach for extending the IEEE 1394 serial bus via a wireless bridge, a method for synchronizing two or more 1394 buses, via wireless 1394 bridges, is defined in the ETSI TS 101 493-3 Specification, "Broadband Radio Access Networks (BRAN); HIPERLAN Type 2; Packet Based Convergence Layer; Part 3: IEEE 1394 Service Specific Convergence Sublayer (SSCS). In particular, the ETSI TS 101 493-3 specification defines a capability for providing synchronization between multiple 1394 buses connected via an HL/2 wireless area network (WLAN).

Accordingly, the present invention proposes a new clock synchronizing mechanism that can be implemented in the 802.11 environment.

SUMMARY OF THE INVENTION

The present invention provides a system and associated method for providing clock synchronization of nodes via a wireless local area network (WLAN).

The present invention encompasses, in one of its aspects, a method for performing clock synchronization of clock registers of nodes coupled via a network, which can be a wired or wireless network. The method includes the steps of: transmitting from a pre-designated master node in the network to a plurality of non-master nodes in the network, a first synchronization frame $F_i$ at near-periodic intervals; storing a current cycle time value, a(n), at the master node in the network corresponding to the end of the synchronization frame; upon receiving the first synchronization frame $F_i$, storing, at each of the non-master nodes, the locally generated current cycle time value, b(n); transmitting, from the master node, a second synchronization frame $F_{i+1}$ including the cycle time a(n) and the sequence number n corresponding to the first synchronization frame; upon receiving the second synchronization frame $F_{i+1}$, at each of the non-master nodes, computing a cycle time difference value, a(n)−b(n), at each of the non-master nodes; and adjusting the local time base at each of the non-master nodes in accordance with the computed cycle time difference value.

The present invention encompasses, in another of its aspects, a system for implementing the aforementioned method, the system comprising means for transmitting a synchronization frame, $F_i$ from a master node; means for detecting a symbol position during transmission of the synchronization frame, $F_i$ over the wireless network at the master node; means for saving a cycle time value, a(n), associated with the time of detection of the symbol position during transmission, and a sequence number n of the synchronization frame $F_i$; means for receiving the transmitted synchronization frame, $F_i$ at each non-master node; means for detecting the symbol position during reception of the synchronization frame, $F_i$ at each non-master node; means for saving a cycle time value, b(n), associated with a time of detection of the symbol position of the received synchronization frame, $F_i$ and a sequence number n of the synchronization frame $F_i$; means for transmitting a next synchronization frame, $F_{i+1}$, including the saved cycle time, a(n) and sequence number n, corresponding to the previously transmitted synchronization frame, $F_i$; means for computing a cycle time value difference, a(n)−b(n) at each non-master node; and means for adjusting the local time base of each non-master node in accordance with the computed time difference.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where:

FIG. 3 is a flow chart illustrating the operation steps for adjusting the local time base of non-master nodes according to an embodiment of the present invention.

DETAILED DESCRIPTION OF THE PRESENT INVENTION

In the following detailed description of the present invention, numerous specific details are set forth in order to provide a thorough understanding of the present invention. However, it will be apparent to one skilled in the art that the present invention may be practiced without these specific details. For the purposes of clarity and simplicity, well-known structures and devices are shown in block diagram form, rather than in detail, in order to avoid obscuring the present invention.

The present invention is described below in the context of synchronizing 1394 wireless nodes via an 802.11 wireless LAN. However, it is to be appreciated that the teachings of the invention discussed herein are not so limited. That is, the invention is applicable to any communication system, wired or wireless, that requires stringent synchronization as defined herein. For example, the present invention has applicability to wired communication systems, such as IEEE 802.3 and Ethernet.

Figure 1:
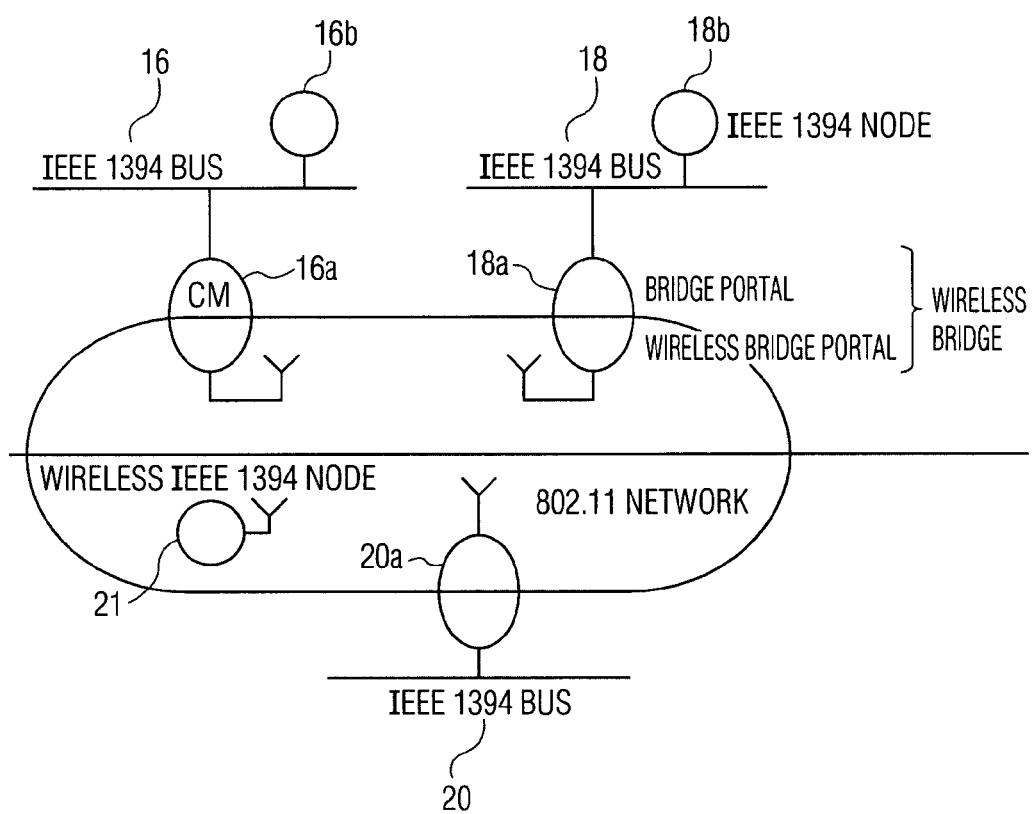
FIG. 1 illustrates the architecture of a wireless communication system whereto embodiments of the present invention are to be applied.

With reference now to the figures, and in particular with reference to FIG. 1, an IEEE 802.11 wireless network 10 in which a preferred embodiment of the present invention may be implemented is depicted. Network 10 includes 1394 buses 16, 18 and 20, which in the exemplary embodiment have associated therewith wireless bridges (nodes) 16a, 18a and 20a. Wireless bridges 16a, 18a and 20a serve as entrance points through which wireless communications may occur over the network 10 between the 1394 buses 16, 18 and 20. Network 10 also includes a 1394 stand-alone wireless node 21 which can represent any standalone device such as, a digital video camera or a palm device, which is able to use the 1394 protocol to communicate with other devices. Network 10 further includes wired 1394 nodes 16b and 18b.

The exemplary embodiment of FIG. 1 is shown only to more clearly describe the present invention and those skilled in the art will recognize that numerous variations are possible, both in form and function. For instance, network 10 might include a greater or lesser number of 1394 buses and/or any other kind of nodes requiring synchronization. Network 10 may also include a greater or lesser number of stand-alone nodes or non stand-alone nodes requiring synchronization. It should be appreciated that network 10 may use 802.11 WLAN technology, as shown in the exemplary embodiment of FIG. 1, or any other kind of wireless/wired communication system to connect wireless/wired nodes/buses. All such variations are believed to be within the spirit and scope of the present invention. Network 10 and the exemplary figures below are provided solely as examples for the purposes of explanation and are not intended to imply architectural limitations.

Figure 2A:
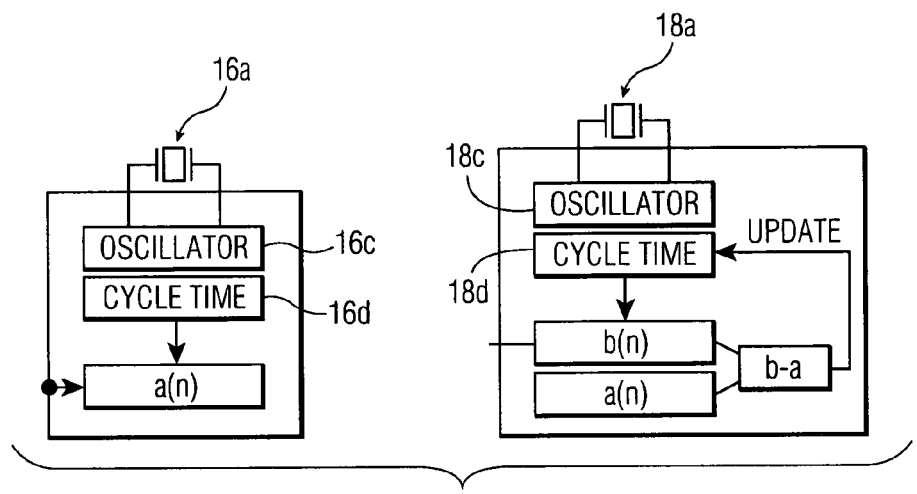
FIG. 2a illustrates the master node and a representative non-master node from the communication system of FIG. 1.

To perform clock synchronization in network 10, timestamp values are generated from a node arbitrarily designated as a master node (or "root node") in the network 10. In network 10, node 16a is arbitrarily selected as the master clock master node to which every other non-master node (slave node) in the network is synchronized. The master node 16a in network 10 has the role of clock distribution within the network. With reference now to FIG. 2a, for ease of explanation, only the master node 16a and a single non-master node 18a are shown. It is noted that the operations performed in the single illustrated non-master node 18a, occur in an identical fashion in all other non-master nodes of the network 10.

FIG. 2a illustrates the constitution of the master node 16a and non-master node 18a according to an embodiment of the invention. The master node 16a and non-master node 18a are shown to include internal 24.576 MHz clocks (oscillators) 16c and 18c and associated cycle time registers 16d and 18d. The 24.576 clocks 16c, 18c run freely and update the contents of the associated cycle time registers 16d, 18d. The cycle time registers 16d, 18d provide fields that specify the current time value and a write to the cycle time register initializes the clock hardware to the value contained in the write transaction. The elements that constitute master node 16a and non-master node 18a are conventional and will not be further described.

Figure 2B:
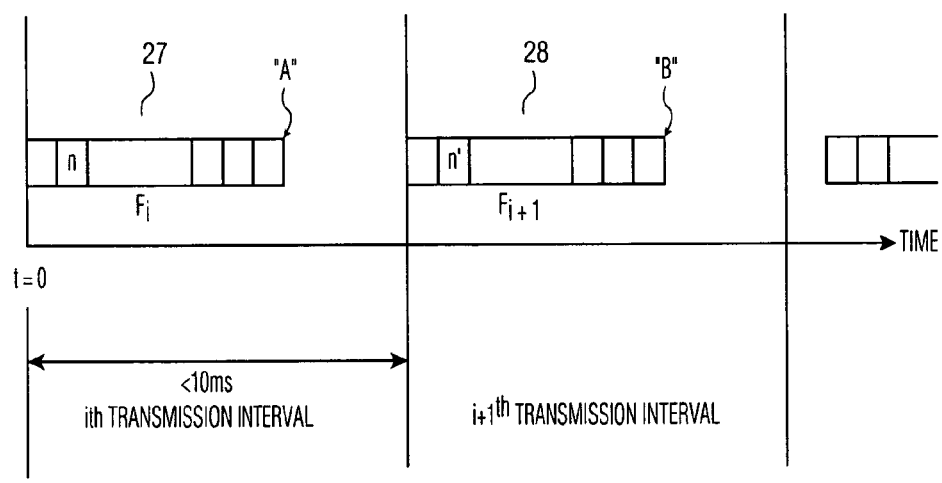
FIG. 2b illustrates two successively transmitted synchronization frames which are transmitted at near-periodic intervals from the master node to all of the non-master nodes.

FIG. 2b illustrates two successively transmitted synchronization frames, $F_i$ 27 and $F_{i+1}$ 28, which may be transmitted at near-periodic intervals from the master node 16a to all of the non-master nodes, e.g., non-master node 18a, in the network 10 to perform clock synchronization in accordance with the method of the invention. Preferably, the selected near-periodic interval is less than or equal to 10 milliseconds to allow proper synchronization between all of the wireless nodes in the network 10. Each synchronization frame is identified by both its source address (i.e., the MAC address of the master node transmitting the frame) and a destination address. The destination address is a special multicast address reserved explicitly for performing clock synchronization.

I. The Clock Synchronization Process

With reference now to FIG. 3, illustrative steps involved in providing clock synchronization of nodes in a wireless local area network (WLAN) in accordance with the exemplary embodiment of the present invention will now be described. In the following description, it is assumed that a node from among the plurality of nodes in the network 10 has been pre-designated as a master node, node 16a. It is also assumed that the propagation delay from the master node to each of the non-master nodes, e.g., node 18a in the network is negligible.

With continued reference to FIG. 3, the flowchart illustrates at step 53, at the ith transmission interval, the master node transmits a synchronization frame $F_i$ to each non-master node in the network.

At step 55, at the ith iteration cycle of the method, a synchronization frame, $F_i$, is transmitted from the master node 16a which includes the cycle time, $a(n_{i-1})$ and associated sequence number $n_{i-1}$, saved in the previous iteration cycle of the method. Concurrent with the transmission of synchronization frame $F_i$, detection means associated with the master node 16a detect the over air transmission of a "Last_Symbol_On_Air" symbol position (see point "A" of FIG. 2b) of the ith transmitted synchronization frame $F_i$. As shown in FIG. 2, in the exemplary embodiment, the "Last_Symbol_On_Air" symbol position corresponds to the termination point of the last symbol position of the synchronization frame, $F_i$. It is contemplated that, in alternate embodiments, any point may be selected along the synchronization frame, however, point "A" is selected for purpose of explanation.

At step 57, at the ith iteration cycle of the method, the master node 16a saves the cycle time value, $a(n_i)$, which is a detection time corresponding to the "Last_Symbol_On_Air" 27 symbol position as the frame is being transmitted from the master node 16a. The master node 16a also saves the sequence number, $n_i$, of the transmitted frame $F_i$. The sequence number, $n_i$, transmitted within the synchronization frame is used to associate cycle time values, saved in the non-master nodes, with the corresponding synchronization frame that originated the saved cycle time values. The sequence number, $n_i$, is a unique number generated by the transmitter of a frame and it is generally included in the MAC header of the MAC frames. This is used in the non-master nodes to compare the $a(n_i)$ values with their corresponding $b(n_i)$ values, and to be sure that both cycle times in the master node and non-master nodes were saved using the same frame.

When the synchronization frame 27 is transmitted from the master node 16a, the detection of the "Last_Symbol_On_Air" symbol position point ("A") will be informed to both the MAC layer and the 1394 Convergence Layer by the physical (PHY) layer. More particularly, the presence of the "Last_Symbol_On_Air" (point "A") will be announced in the master node 16a by the physical layer to the upper layers using the PHY-TXEND.confirm.

At step 59, an adjustment step is required. Specifically, the process of reporting the time of detection, i.e., point "A", to the upper layers has an associated time delay. As such, the value of $a(n_i)$ stored at the master node 16a is adjusted for this delay as follows:

$$a(n_i) = \text{cycle\_time}_{(at\ observed\ PHY\text{-}TXEND.confirm)} - \text{offset} \quad (1)$$

where the offset is the difference between the time PHY-TXEND.confirm is observed by the higher layers and the time when the PHY layer detects the "Last_Symbol_On_Air" symbol position (point "A").

At step 61, at the ith iteration cycle of the method, upon receiving the transmitted synchronization frame, $F_i$ 27 at the non-master node 18a, the non-master node 18a detects the "Last_Symbol_On_Air" symbol position (point "A") as it is being received over the air from the master node 16a. When the synchronization frame 27 is received at the non-master node 18a, the detection of the "Last_Symbol_On_Air" symbol position, point "A", 27 will be informed to both the MAC layer and the 1394 Convergence Layer by the physical (PHY) layer. More particularly, the presence of the "Last_Symbol_On_Air" (point "A") will be announced in the non-master nodes by the physical layer to the upper layers using the PHY-RXEND.indication.

At step 63, at the ith iteration cycle of the method, the non-master node 18a, saves the local cycle time value, $b(n_i)$, when the "Last_Symbol_On_Air" symbol position (point "A") of the synchronization frame is detected as it is being received over air from the master node 16a. The non-master node also saves the sequence number, $n_i$, of the synchronization frame $F_i$ 27.

At step 65, an adjustment step is required. Specifically, the process of reporting the time of detection, i.e., point "A", to the upper layers has an associated time delay. As such, the value of $b(n_i)$ stored at the master node 16a is adjusted for this delay as follows:

$$b(n_i) = \text{CYCLE\_TIME}_{(at\ observed\ PHY\text{-}RXEND.indication)} - \text{offset} \quad (2)$$

where the offset is the difference between the time PHY-RXEND.indication is observed by the higher layers and the time when the "Last_Symbol_On_Air" symbol position (point "A") is detected by the PHY layers.

At step 67, at the ith iteration cycle of the method, a cycle time difference value is computed. Specifically, at the non-master node 18a, a processor associated with the non-master node 18a computes a cycle time difference value:

$$a(n_{i-1}) - b(n_{i-1}), \quad (3)$$

where:

$a(n_{i-1})$ is the cycle time value stored at the master node in the previous iteration cycle, and $b(n_{i-1})$ is the cycle time value stored at the non-master node in the previous iteration cycle At step 69, at the ith iteration cycle of the method, the local time base of the non-master node is adjusted in accordance with the computed cycle time difference value of equation (3).

Furthermore, while there have been described herein the principles of the invention, it is to be clearly understood to those skilled in the art that this description is made only by way of example and not as a limitation to the scope of the invention. Accordingly, it is intended, by the appended claims, to cover all modifications of the invention, which fall within the true spirit and scope of the invention. Furthermore, it is to be noted that although the present invention and its advantages have been described in detail, it should be understood that various changes, substitutions, and alterations can be made herein without departing from the spirit and scope of the invention as defined by the appended claims.

What is claimed is:

1. In a communication system including a plurality of non-master nodes being communicatively coupled via a network, each of said plurality of non-master nodes having a local time base, one of said plurality of non-master nodes being designated as a master node having a master time base which serves as a master clock against which said non-master node's local time bases are synchronized, a clock synchronization method for adjusting the local time bases, the method comprising the steps of:

in an ith iteration cycle, at said master node:
(1) transmitting a synchronization frame, $F_i$, including an i–1th iteration cycle master node time value, $a(n_{i-1})$, and an i–1th iteration cycle sequence number, $n_{i-1}$;
(2) detecting, during transmission from said master node, a predefined symbol position associated with said transmitted synchronization frame, $F_i$;
(3) saving an ith iteration cycle master node time value, $a(n_i)$, corresponding to a time of detection of said predefined symbol position; and
(4) saving an ith iteration cycle sequence number, $n_i$, corresponding to said synchronization frame, $F_i$;

at each of said non master nodes:
(a) receiving said synchronization frame, $F_i$;
(b) detecting, during reception of said synchronization frame, $F_i$, said predefined symbol position;
(c) saving an ith iteration cycle non-master node cycle time value, $b(n_i)$, corresponding to a time of detection of said predefined symbol position;
(d) saving said ith iteration cycle sequence number, $n_i$ corresponding to said synchronization frame, $F_i$;
(e) computing a cycle time difference value as, $a(n_{i-1})-b(n_{i-1})$,
wherein $b(n_{i-1})$ is an i–1th iteration cycle non-master node time value; and
(f) adjusting said non-master node's local time base in accordance with said computed cycle time difference value.

2. The method of claim 1, wherein in an i+1th iteration cycle, $a(n_i)$ and $b(n_i)$, stored in said ith iteration cycle, are used to compute said cycle time difference value.

3. The method according to claim 2, wherein $a(n_i)$ and $n_i$, are transmitted in a next synchronization frame, $F_{i+1}$.

4. The method of claim 1, wherein said network is one of a wired and a wireless network.

5. The method of claim 2, wherein said wireless network operates in accordance with the IEEE 802.11 wireless standard.

6. The method of claim 1, wherein said synchronization frame $F_i$ and said next synchronization frame, $F_{i+1}$ are transmitted at near-periodic intervals.

7. The method of claim 1, further comprising the step of correcting the saved cycle time value, $a(n_i)$, at the master node, by subtracting an offset value prior to said step (3), said corrected cycle time value computed as:

$$a(n_i)_{corrected} = \text{cycle\_time}_{(at\ observed\ PHY\text{-}TXEND.confirm)} - \text{offset}$$

where:
offset=a delay associated with a time difference between the observation of the said symbol position of said synchronization frame $F_i$ and said next synchronization frame, $F_{i+1}$ at a higher layer of the hierarchy and the time of detection at the physical layer; and;
PHY-TXEND.confirm=a time that the physical layer confirms the detection of said symbol position.

8. The method of claim 1, further comprising the step of correcting the saved cycle time value, $b(n_i)$, at each of said non-master nodes, by subtracting an offset value prior to step (iv), computed as:

$$b(n_i)_{corrected} = \text{cycle\_time}_{(at\ observed\ PHY\text{-}RXEND.indication)} - \text{offset}$$

where:
offset=a delay associated with a time difference between the observation of said symbol position of said synchronization frame $F_i$ and said next synchronization frame, $F_{i+1}$ at a higher layer of the non-master node hierarchy and the time of detection at the physical layer; and
PHY-RXEND.indication=a time that the physical layer confirms the detection of said symbol position.

9. The method of claim 1, wherein the sequence number, $n_i$ of the synchronization frame $F_i$ and the sequence number $n_{i+1}$ of the next synchronization frame, $F_{i+1}$, corresponds to a 2-octet sequence control field of the synchronization frame.

10. The method of claim 1, wherein the synchronization frame $F_i$ and said next synchronization frame, $F_{i+1}$ are medium access control (MAC) frames.

11. The method of claim 1, wherein the synchronization frame $F_i$ and said next synchronization frame, $F_{i+1}$ are identified at each of said non master nodes by a source address and a destination address.

12. The method of claim 11, wherein the destination address is a reserved multicast medium access control (MAC) address, reserved for transmitting clock synchronization information.

13. In a communication system including a plurality of non-master nodes said plurality of non-master nodes being communicatively coupled via a network, each of said plurality of non-master nodes having a local time base, one of said plurality of non-master nodes designated as a master node having a master time base which serves as a master clock against which said non-master local time bases are synchronized, a clock synchronization method for adjusting the local time bases, the method comprising the steps of:

(a) transmitting an ith synchronization frame $F_i$ from said master node over said network to said plurality of non-master nodes;
(b) saving a cycle time value, $a(n_i)$, corresponding to a time of detection of a symbol position of the ith synchronization frame $F_i$ and a sequence number $n_i$ associated with said ith synchronization frame $F_i$;

at said plurality of non-master nodes:
(c) receiving said ith synchronization frame $F_i$;
(d) detecting the symbol position of said ith synchronization frame $F_i$;
(d) saving a cycle time value, $b(n_i)$, associated with a time of detection of the symbol position and said sequence number $n_i$ associated with said ith synchronization frame $F_i$;
(e) computing a cycle time difference value as:

$a(n_{i-1})-b(n_{i-1})$; and (f) adjusting said local time bases in accordance with said computed cycle time difference value.

14. The communication system of claim 13, further comprising the step of transmitting an i+1th synchronization frame, $F_{i+1}$, from said master node in a next iteration of said clock synchronization method, said next synchronization frame, $F_{i+1}$, including said cycle time value, $a(n_i)$, and said sequence number $n_i$ saved at the ith iteration cycle at said step (b).

15. In a communication system including a plurality of non-master nodes said plurality of non-master nodes being communicatively coupled via wireless a network, each of said plurality of non-master nodes having a local time base, one of said plurality of non-master nodes designated as a master node having a master time base which serves as a master clock against which said non-master local time bases are synchronized, a clock synchronization method for adjusting the local time bases, the system comprising:

means for transmitting a current synchronization frame, $F_i$;

means for detecting a symbol position during on air transmission of the current synchronization frame, $F_i$ over said wireless network;

means for saving a cycle time value associated with a time of detection of the detected symbol position during said transmission, and a sequence number of said current synchronization frame;

means for receiving said transmitted current synchronization frame;

means for detecting the symbol position during on air reception of the received current synchronization frame over said network;

means for saving a cycle time value associated with a time of detection of the symbol position of the reception of said current synchronization frame and a sequence number n of said current synchronization frame;

means for transmitting a next synchronization frame including the saved symbol position and sequence number corresponding to said current synchronization frame;

means for computing a cycle time value difference; and means for adjusting said local time base in accordance with said computed time difference.

* * * * *